INVENTOR
ADRIAAN VAN BLOOIS.
BERNARDUS H. GEELS.
BY
Frank R. Jifani
AGENT

DEVICE FOR AUTOMATIC ASCERTAINMENT OF AN INTERRUPTION IN A SEQUENCE OF SUCCESSIVELY INCOMING SERIAL NUMBERS

Filed Feb. 3, 1961 2 Sheets-Sheet 2

INVENTOR
ADRIAAN VAN BLOOIS.
BERNARDUS H. GEELS.
BY
AGENT

United States Patent Office 3,229,256

Patented Jan. 11, 1966

3,229,256

DEVICE FOR AUTOMATIC ASCERTAINMENT OF AN INTERRUPTION IN A SEQUENCE OF SUCCESSIVELY INCOMING SERIAL NUMBERS

Adriaan van Bloois and Bernardus Hendrikus Geels, Hilversum, Netherlands, assignors to North American Philips Company, Inc., New York, N.Y., a corporation of Delaware Filed Feb. 3, 1961, Ser. No. 87,011
Claims priority, application Netherlands, Feb. 17, 1960, 248,535
4 Claims. (Cl. 340—172.5)

The invention relates to a device for the automatic ascertainment of an interruption in a sequence of successively incoming serial numbers, which device comprises two registers, in each of which a number can be stored, a comparsion member which is capable of ascertaining whether the numbers stored in the two registers are equal or unequal, this member producing, in the case of unequality, a signal in an adder capable of raising by one the number stored in the second of the two registers, provision being made of means to transfer an incoming serial number to the first of the two registers.

Such devices may be used, for example, in automatic telegraph systems. The telegrams transmitted via a channel are provided with a serial number. The serial numbers constitute a running sequence of numbers in which each serial number exceeds normally by one the preceding serial number.

At the receiver end of the transmission channel the telegrams are received in the order in which they are transmitted. The serial number of an incoming telegram is, consequently, normally higher by one than the serial number of the previously received telegram.

The second register of the known device comprises a digit equal to the serial number exceeding by one of the previously received telegram. When a new telegram is received its serial number is compared with the said number. If equality is stated, the telegram can be sent to the desired outlet channel. The known device produces a signal, when unequality is stated. Then the transmission of the new telegram is postponed until a supervising operator has taken down the serial number of the new telegram and the number stored in the second register. These two numbers indicate the end and the beginning respectively of the interruption in the sequence of incoming serial numbers. Then the operator again actuates the comparison member.

It should be noted that in the known device the number stored in the second register is raised by one after the comparison of the numbers. For practical reasons it may be preferable to augment the number by one after the reception of the new serial number in the first register and to compare subsequently the numbers stored in the two registers. In this method the number stored in the second register is equal to the last-received serial number. For the invention it is unessential which of the two methods is employed.

The known device has a disadvantage in that the delay occurring in the transmission of a received telegram to the desired outlet channel may be great.

The invention has for its object to obviate this disadvantage.

The device according to the invention comprises to this end means to transfer an incoming serial number to the second register, whilst the assembly is such that the incoming of the serial numbers produces signals which actuate successively the comparison member, the last-mentioned transfer means and the adder in the following order: comparison member—transfer means—adder—comparison member—transfer means—adder, it being immaterial whether the signal produced by an incoming serial number actuates the comparison member or the adder, the device comprising furthermore a third register and a fourth register, in each of which a number can be stored, means to transmit a number stored in the first register to the third register, means to transmit a number stored in the second register to the fourth register, which means become operative by the comparison member subsequent to the ascertainment of unequality and finally a bistable member, of which the two states are designated by 0 and 1 and which is moved into the state 1, when unequality is stated by the comparison member, whereas the means for the transmission of a number stored in the second register to the fourth register do not become operative when the bistable member occupies the condition 1.

The invention will be described more fully with reference to an embodiment shown in the drawing.

Figure 1:
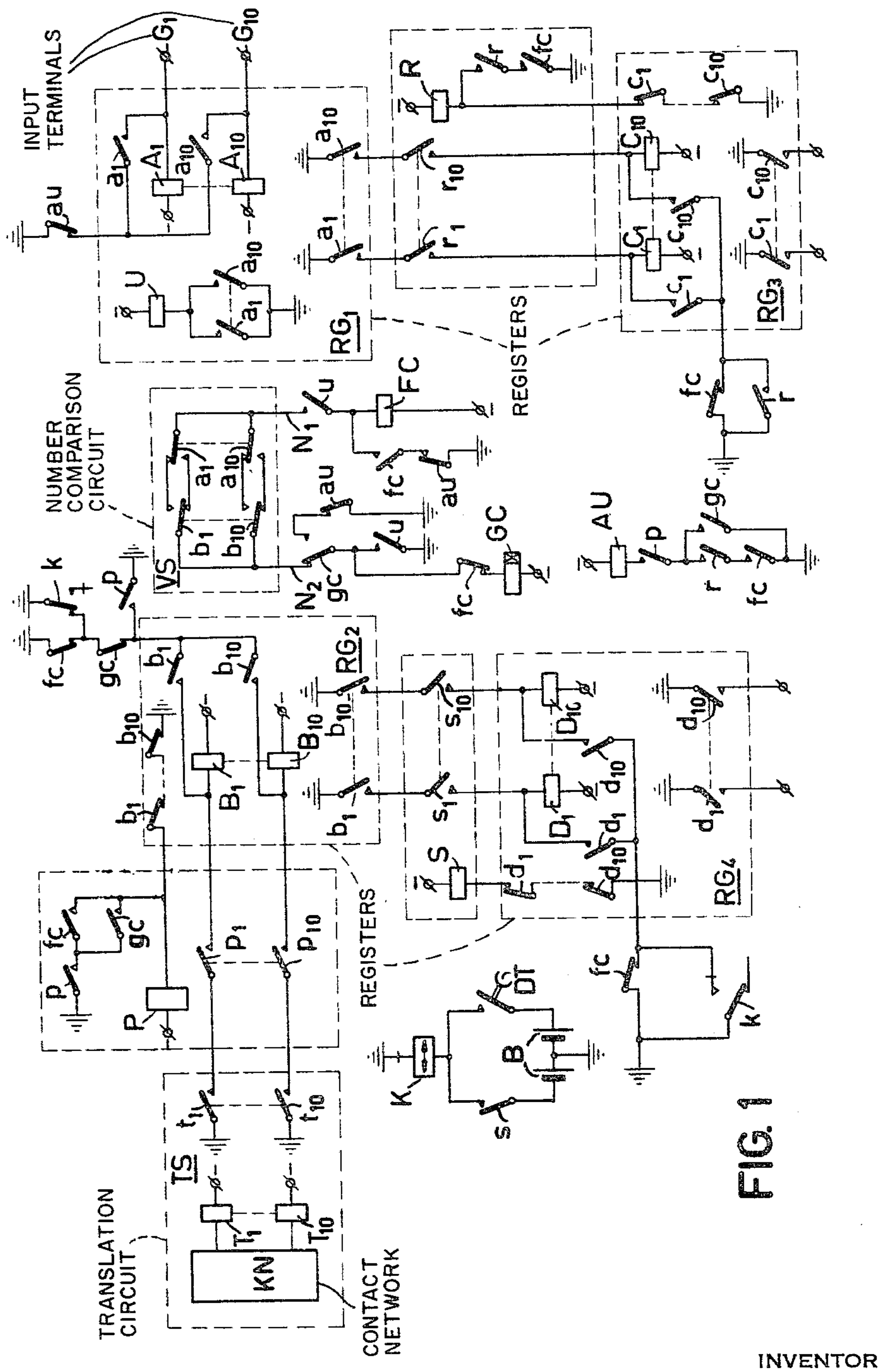
FIG. 1 shows one embodiment.

The serial numbers of telegrams or a different sequence of numbers, in which normally each number exceeds by one the preceding number, are supplied in order of succession to the input terminals $G_1 \ldots G_{10}$ of a register $RG_1$, shown in FIG. 1.

The numbers are coded in a given manner, for example in accordance with a 2-out-of-5 code. For a number of two digits ten code elements are required, which correspond to the input terminals $G_1 \ldots G_{10}$. The presence of a code element is indicated by the connection of the corresponding input terminal to earth.

If at the input terminals $G_1 \ldots G_{10}$ the code elements of a number occur, the relays $A_1 \ldots A_{10}$, connected to these input terminals are energized. After a relay has been energized, it closes a holding circuit for itself via a make contact of the relay and the common break contact *au*.

The incoming number is supposed to be the first serial number. In this case the registers $RG_3$ and $RG_4$ have the number 00 and the register $RG_2$ may have, for example, the number 01.

In the translation circuit TS the number 02 is formed. The circuit TS may be a generally known translation circuit. A particular embodiment thereof is described more fully hereinafter. This circuit comprises ten relays $T_1 \ldots T_{10}$, which are energized via the contact network KN. The translation circuit is shown in detail in FIG. 2. In FIG. 3 is indicated the coding of the numbers employed. With reference to this figure the operation of the translation circuit can be understood in a simple manner. The term "adder" used in the claims is to be understood to denote such a translation circuit.

If, for example, the register $RG_1$ has the number 12, it is evident from FIG. 3 that the relays $A_1$, $A_3$ and $A_7$, $A_{10}$ are energized. A cross-hatched square indicates that the code element concerned is present. The topmost sequence of numbers indicates the decades of the number of the code element and the sequence of numbers below the former indicates the number of the code element for the units.

Figure 2:
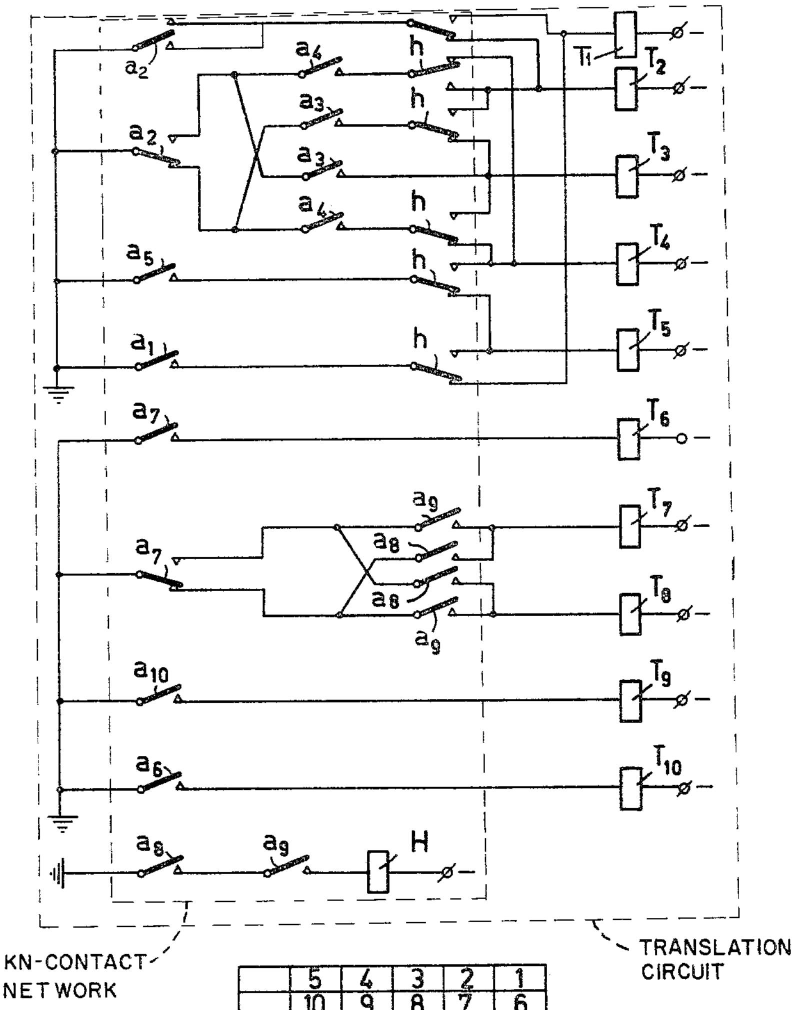
FIG. 2 shows the translation circuit arrangement employed.
Figure 3:
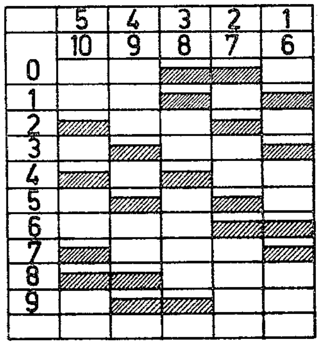
FIG. 3 shows a 2-out-of-5 code.

From FIG. 2 it follows that the relays $T_1$, $T_3$ and $T_6$, $T_9$ are energized. This relay combination corresponds to the number 13, which appears from FIG. 3.

If a number ending in the digit 9 is stored in the register $RG_1$, the relays $A_8$ and $A_9$ are energized. The translation circuit includes a relay H, which is energized by the series combination of the make contacts *a8* and *a9*. The translation circuit increases the decade of the number stored in the register $RG_1$ by one via the change-over contacts *h*. If this number is, for example, 19, the relays $A_1$, $A_3$ and $A_8$, $A_9$ are energized. From FIG. 2 it appears that the relay H and the relays $T_2$, $T_5$ and $T_7$, $T_8$ are energized. This relay combination corresponds to the number 20.

In the embodiment the numbers consist of two digits, which are coded in accordance with a 2-out-of-5 code. However, the invention is not restricted thereto. The circuit may be adapted in a simple and known manner to numbers having more than two digits and to other codes.

Simultaneously to the formation of the number 02 by the translation circuit TS, the relay U is energized via at least one of the make contacts $a_1$ . . . $a_{10}$. In the number comparison circuit VS the numbers stored in the registers $RG_1$ and $RG_2$ are compared with each other. This circuit comprises, in the manner shown, a change-over contact of each of the relays $A_1$ . . . $A_{10}$ and $B_1$ . . . $B_{10}$.

In the case under consideration the registers $RG_1$ and $RG_2$ have the same number, i.e. the number 01. The corresponding relays in the two registers are energized.

Between the conductor $N_2$, which is connected to the change-over contacts $b_1$ . . . $b_{10}$, and the conductor $N_1$, which is connected to the change-over contacts $a_1$ . . . $a_{10}$, no conductive connection is established. However, a conductive connection is established, if a change-over contact connected to the conductor $N_2$ is changed over and the corresponding change-over contact connected to the conductor $N_1$ is not changed over and conversely. In the latter case there is unequality between the numbers stored in the registers $RG_1$ and $RG_2$. This unequality is signalled by the lifting of relay FC. The energizing circuit is as follows: negative voltage, winding relay FC, make contact U, conductor $N_1$, at least one of the change-over contacts $a_1$ . . . $a_{10}$, the corresponding change-over contacts of the group $b_1$ to $b_{10}$, the conductor $N_2$, break contact *gc*, make contact U, earth.

After relay FC has been energized, it closes a holding circuit for itself via the make contact *fc* and the break contact *au*. The energizing circuit of the delayed relay GC is interrupted by the break contact *fc*. Relay GC can then not be lifted.

When the registers $RG_1$ and $RG_2$ have the same numbers, no conductive connection is established between the conductors $N_1$ and $N_2$ and the relay FC cannot be lifted. This equality is signalled by the lifting of relay GC. The energizing circuit is as follows: negative voltage, winding relay GC, break contact *fc*, make contact U, earth. After relay GC has been energized, it closes an individual holding circuit via the make part of the change-over contact *gc* and the break contact *au*.

A break contact of the relay GC opens the holding circuit of the relays in the register $RG_2$, so that the energized relays are deenergized. After the deenergization of these relays relay P is energized via the series combination of the break contacts $b_1$ . . . $b_{10}$. This relay closes an individual holding circuit via the make contacts *p* and *gc*. The make contacts $p_1$ . . . $p_{10}$ of relay P connect the outputs of the translation circuit TS to the corresponding inputs of the register $RG_2$. In the register $RG_2$ the number 02 is stored. After the relays in the register $RG_2$ have been energized, they close an individual holding circuit via the individual make contact and the common make contact *p*. Relay AU is energized via the series combination of the make contacts *p* and *gc*. After relay AU has been energized, the relays in the register $RG_1$ and relay GC are deenergized. After the deenergization of these relays the relays in the translation circuit TS, relay U, relay AU and the relay P are deenergized.

The register $RG_2$ then registers the number 02. If no interruption occurs in the sequence of numbers fed to the register $RG_1$, the subsequent number supplied is the number 02. This number is compared with the number 02 stored in the register $RG_2$ and then raised by one to be supplied to the register $RG_2$. Then the register $RG_2$ has the number 03 and so forth.

The telegrams transmitted through a channel receive a serial number which is always higher by one than the telegram sent before. The first telegram, which is supposed to be sent after midnight receives the serial number 01. The last telegram sent prior to midnight has a high serial number, for example the serial number 95. The number stored in register $RG_2$ will therefore be the number 96. When the number 01 is fed to the register $RG_1$, the comparison member VS ascertains unequality between this number and the number stored in the register $RG_2$. In the manner described above relay FC is energized. After the relay FC has been lifted, the break contact *fc* opens the holding circuits of the relays in the registers $RG_3$ and $RG_4$. The numbers stored in these registers get lost.

After the relays $C_1$ . . . $C_{10}$ in register $RG_3$ have been deenergized, relay R is energized via the series combination of the break contacts $c_1$ . . . $c_{10}$. Relay R closes a holding circuit for itself via the make contacts *r* and *fc*. The outputs of the register $RG_1$ are connected via the make contacts $r_1$ . . . $r_{10}$ of relay R to the inputs of the register $RG_3$. Via these make contacts the number stored in the register $RG_1$ is fed to the register $RG_3$. The relays in the register $RG_3$, which are energized, close a holding circuit for themselves via their individual make contact and the common make contact *r*. The number stored in this register is in this case the number 01.

After the relays $D_1$ . . . $D_{10}$ in the register $RG_4$ have been deenergized, relay S is energized via the series combination of the break contacts $d_1$ . . . $d_{10}$. The outputs of the register $RG_2$ are connected via the make contacts $s_1$ . . . $s_{10}$ of relay S to the inputs of the register $RG_4$. In the register $RG_4$ those relays are energized which correspond with the energized relays in register $RG_2$. The number stored in register $RG_4$ is in this case the number 96. After the relays $D_1$ . . . $D_{10}$ are energized, relay S is deenergized. In the meantime the winding of the polar relay K has been connected via the make contact *s* to the negative terminal of a battery B and thus brought into the operational position. The change-over contact *k* closes with the make side of the contact a holding circuit for the relays $D_1$ to $D_{10}$ in register $RG_4$ and opens by its break side the holding circuit of the relays $B_1$ . . . $B_{10}$ in register $RG_2$. In the manner described above the number formed in the translation circuit TS, in this case the number 02, is fed to the register $RG_2$ and stored herein. Then the relay AU is energized via the series combination of the make contacts *p*, *r* and *fc*. After relay AU is lifted, the circuit is moved into the rest position in the manner described and in this case also the energized relay R is deenergized.

In a manner not shown the relay FC governs a monitoring device. When the monitoring device is actuated, this is an indication for the operator that unequality has been stated.

The outputs of the registers $RG_3$ and $RG_4$ may, for example, be connected, in a manner not shown, via translation circuits, to a digit dial. After the occurrence of the alarm the operator can verify in a simple manner the numbers stored in the said registers.

In the present case the registers $RG_3$ and $RG_4$ have the number 96 and the number 01 respectively. These numbers provide the operator with the information that the last serial number received before midnight is the serial number 95 and that a new sequence of serial numbers has started.

The operator then actuates the push-button DT. This button connects the winding of the polar relay K to the positive terminal of the battery B. Thus the relay goes over to the rest position.

In the holding circuit of the relays $D_1$ . . . $D_{10}$ in rgeister $RG_4$ the break contact *fc* is no longer shunted by the change-over contact *k*. On the contrary the change-over contact *k* shunts the break contact *fc* in the holding circuit of the relays $B_1$ . . . $B_{10}$ in register $RG_2$.

If no interruptions occur in the new sequence of serial numbers, the arrangement operates in the manner described above, so that the new serial number, raised by one, is stored in register $RG_2$.

If an interruption occurs in the sequence of serial numbers, since one or more serial numbers have not been received, the number stored in register $RG_2$, corresponding with the first, non-received serial number, will, as described above, be transferred to the rgeister $RG_4$ and the new incoming serial number will be transferred to the register $RG_3$. At the same time relay K is brought into the operational condition and an alarm is given.

The serial numbers subsequently received are worked up in the manner described above. The numbers in the registers $RG_3$ and $RG_4$ remain stored herein.

If again an interruption occurs in the sequence and if relay K is in the operational position, the holding circuit of the relays $B_1 \ldots B_{10}$ in the register $RG_2$ is interrupted after relay FC has been lifted. The relays $D_1 \ldots D_{10}$ in register $RG_4$ remain energized.

As described above, the register $RG_2$ has fed to it the number formed in the translation circuit TS. The register $RG_3$ receives the new serial number.

Owing to the energization of relay AU the arrangement is brought into the rest position.

The number stored in the register $RG_4$ continues indicating the first, non-received serial number. The number stored in register $RG_3$ is the first serial number received after the second interruption.

When, after an alarm, the operator actuates the pushbutton DT, a new interruption of the sequence of serial numbers is completely registered by the registers $RG_3$ and $RG_4$.

What is claimed is:

1. A system for detecting the interruption of a sequence in sequentially occurring input signals, said system comprising first, second, third and fourth registers, a source of said input signals, signal comparison means, an adder, means applying said input signals to said first register and to said adder, said adder adding a predetermined signal to said input signal, means applying signals stored in said first and second registers to said comparison means, means responsive to the detection of an equality in said comparison means for clearing said first and second registers and for applying the output of said adder to said second register, means responsive to the detection of an inequality in said comparison means for transferring the signals in said first and second registers to said third and fourth registers respectively, for clearing said first and second registers, and for applying the output of said adder to said second register, and reset means for inhibiting subsequent transfer of signals from said second register to said fourth register while permitting subsequent transfer of signals from said first register upon the detection of a subsequent inequality in said comparison means.

2. A system for detecting the interruption of a sequence in sequentially occurring input signals, said system comprising first, second, third and fourth registers an adder for adding a predetermined signal to said input signal, signal comparison means comprising first control means responsive to an equality between signals applied thereto and second control means responsive to an inequality between signals applied thereto, first circuit means for transferring signals from said first register to said third register, second circuit means for transferring signals from said second register to said fourth register, third circuit means for transferring signals from said adder to said second register, means applying said input signals to said first register and adder, means for comparing signals of said first and second registers in said comparison means, said first control means being connected to permit transfer of signals by way of said third circuit means, and to clear said first and second registers said second control means being connected to permit transfer of signals by way of said first, second and third circuits and to clear said first and second registers, and reset means for inhibiting transfer of signals by way of said second circuit but permitting transfer of signals by way of said first circuit subsequent the detection of a first inequality in said comprising means.

3. A system for detecting the interruption of a sequence in sequentially occurring input signals, said system comprising first, second, third and fourth registers, and adder for adding a predetermined signal to said input signal, signal comparison means having first and second relay means responsive to equality and inequality respectively of signals applied to said signal comparison means, first contact means for transferring signals from said first register to said third register, second contact means for transferring signals from said second register to said fourth register, third contact means for transferring signals from said adder to said second register, means applying said input signals to said first register and said adder, means for comparing the signals of said first and second registers in said comparison means to selectively operate said first and second relay means, said first relay means having first and second contacts connected to clear said first and second registers, and third contacts connected to close said third contact means for a predetermined time upon the detection of an equality, said second relay means comprising fourth, fifth and sixth contacts connected to close said first, second and third contact means, and seventh and eighth contacts connected to clear said first and second registers and reset means for inhibiting the closing of said second contact means while permitting the closing of said first contact means upon the detection of a second inequality in said comparison means.

4. The system of claim 3 in which said first, second and third contact means are contacts of third, fourth and fifth relay means respectively, said fourth contacts being connected to clear said third register and energize said third relay means, said fifth contacts being connected to clear said fourth register and energize said fourth relay means, and said third and sixth contacts being connected to energize said fifth relay means.

References Cited by the Examiner

UNITED STATES PATENTS

| | | | |
|---|---|---|---|
| 2,798,216 | 7/1957 | Goldberg | 340—172.54 |
| 2,901,732 | 8/1959 | Canning | 340—172.54 |
| 2,911,622 | 11/1959 | Ayres | 340—172.54 |
| 2,959,351 | 11/1960 | Hamilton | 235—153 |

ROBERT C. BAILEY, *Primary Examiner.*

IRVING L. SRAGOW, *Examiner.*